United States Patent [19]

Miyamori

[11] Patent Number: 5,663,786
[45] Date of Patent: Sep. 2, 1997

[54] FILM CHARGING APPARATUS FOR PHOTOGRAPHIC PRINTER

[75] Inventor: Takahisa Miyamori, Wakayama, Japan

[73] Assignee: Noritsu Koki Co., Ltd., Wakayam-ken, Japan

[21] Appl. No.: 526,487

[22] Filed: Sep. 11, 1995

[30] Foreign Application Priority Data

Sep. 13, 1994 [JP] Japan ................. 6-219030

[51] Int. Cl.⁶ .................. G03B 27/00; G03B 27/62
[52] U.S. Cl. ................. 355/72; 355/74; 355/75
[58] Field of Search .................. 355/72, 74, 75

[56] References Cited

U.S. PATENT DOCUMENTS

| | | | |
|---|---|---|---|
| 2,263,025 | 11/1941 | Young et al. | 88/24 |
| 4,042,301 | 8/1977 | Heidrich et al. | 355/75 |
| 4,453,817 | 6/1984 | Oka et al. | 355/75 |
| 4,736,228 | 4/1988 | Ito | 355/75 |
| 5,128,714 | 7/1992 | Kishino et al. | 355/76 |
| 5,550,613 | 8/1996 | Hasegawa et al. | 355/41 |

Primary Examiner—R. L. Moses
Assistant Examiner—Shival P. Virmani
Attorney, Agent, or Firm—Felfe & Lynch

[57] ABSTRACT

A film charging apparatus for a photographic printer is disclosed. The apparatus includes a film mount for supporting a film or a holder of the film from the under, a fixing cover manually openable and closable relative to the film mount and operable, in a full-closed state thereof, to fix the film or the holder supported on the film mount by pressing the film or holder from the above, and a positioning mechanism switchable between a position-fixing state for restricting a movable range of the film relative to the film mount thereby to fixedly position the film relative to the mount and a position-releasing state for releasing the restriction. The positioning mechanism is set at the position-fixing state when the fixing cover is under a predetermined opened condition. The mechanism is switched over to the position-releasing state when the fixing cover has reached an intermediate state before a full closed state in the course of movement thereof to the full closed state.

10 Claims, 6 Drawing Sheets

FILM CHARGING APPARATUS FOR PHOTOGRAPHIC PRINTER

BACKGROUND OF THE INVENTION

1. Field of the Invention

The present invention relates to a film charging apparatus for a photographic printer for charging and positioning a film at a position where the film is subjected to an operation such as a printing operation.

2. Description of the Related Art

For effecting an operation such as a printing operation on a film in a photographic printer, it is necessary to set the film at-an appropriate position with respect to an image recorded on the film.

To do this, a positioning means is provided for restricting a movable range of the film relative to a film mount so as to fixedly retain the film per se or a holder holding the film at the predetermined position.

On the other hand, with such photographic printer, in addition to e.g. the printing operation on the film with restricting the movable range of the film to a fixed mount, there is sometimes effected a so-called trimming operation in which the film or its holder is moved so as to freely vary an area of the film to be subjected to the desired operation such as the printing operation.

When such trimming operation is effected, the film cannot be moved freely if its movable range is uniformly restricted by the positioning means. Accordingly, in order to allow for both the positioning operation of the film on the film mount and the trimming operation, the convention has provided a construction for enabling switchover between a position-fixing state for fixedly positioning the film and a position-releasing state for releasing the position of the position of the film.

As such construction described above, the convention specifically provided a positioning projection on the film mount. Normally, after the film or its holder is set at the predetermined position with the aid of the projection, a fixing cover is completely closed to fix the film or holder at this position. And, this operation is repeated. Then, only when a trimming operation is to be effected, the projection is caused to be retracted away from the film mount, so as to render the film or holder freely movable on the mount.

With the above-described construction, however, for each trimming operation, the above-described procedure is needed. In particular, when the trimming operations are effected in an intermittent manner, the apparatus operation becomes very troublesome. In this respect, improvement has been desired.

In view of the above state of the art, the main object of the present invention is to provide an apparatus which allows a trimming operation with greater convenience.

SUMMARY OF THE INVENTION

For accomplishing the above-noted object, a film charging apparatus for a photographic printer, according to the present invention, comprises:

- a film mount for supporting a film or a holder of the film from the under;
- a fixing cover manually openable and closable relative to the film mount and operable, in a full-closed state thereof, to fix the film or the holder supported on the film mount by pressing the film or holder from the above;
- positioning means switchable between a position-fixing state for restricting a movable range of the film relative to the film mount thereby to fixedly position the film relative to the mount and a position-releasing state for releasing the restriction of the movble range;
- wherein the positioning means is set at the position-fixing state when the fixing cover is under a predetermined opened condition; and the positioning means is switched over to the position-releasing state when the fixing cover has reached an intermediate state before a full closed state in the course of movement thereof to the full closed state.

According to the above described construction, when the fixing cover is under the predetermined opened condition, the positioning means is set at the position-fixing state, so that the movable range of the film or holder mounted on the film mount is restricted to fixedly position the film thereon.

When no trimming operation is effected, after the above-described positioning operation of the film, the fixing cover is directly moved to the full closed state, so as to maintain the film or holder at the predetermined position.

Whereas, in effecting a trimming operation, the fixing cover is brought to the intermediate state realized in the middle of its movement toward the full closed state. In this condition, the fixing cover has not yet reached its full closed state. Thus, the film or holder may be freely moved on the film mount. Also, the positioning means is under the position-releasing state, whereby the film or holder is released from the restriction of its movable range.

Accordingly, with a position adjustment by freely moving the film or holder on the mount, the trimming operation may be effected. After completion of this trimming operation, the fixing cover is moved farther to the full closed state so as to fixedly maintain the film or holder at the predetermined position.

That is to say, the switchover to a trimming operation is possible with the simple operation of the fixing cover which is originally provided for fixedly maintaining the film or holder at the predetermined position.

As a result, the trimming operation may be effected with greater convenience by such simple operation.

According to a further aspect of the present invention, the positioning means includes a positioning projection which is projectable and retractable relative to an upper surface of the film mount, a projection/retraction operating member operably connected with the positioning projection, and a projection urging means for urging the projection and the projection/retraction operating member to a projecting side. The positioning means is switched over to the position-releasing state when an operating element provided to the fixing cover comes into contact with the projection-retracting operating member so as to depress the positioning projection.

With the above construction, when the fixing cover is at the predetermined opened state, the operating element of this fixing cover is out of contact from the projection/retraction member, so that the positioning projection remains projecting from the upper surface of the film mount.

This projecting projection serves to restrict the movable range of the film or holder thereby to allow fixed positioning of the same.

With a closing operation of the fixed cover, in the middle of its movement toward the full closed state, the operating element of the fixed cover comes into contact with the projection/retraction operating member, thereby to depress the positioning projection which has been projecting from the upper surface of the film mount, so that the projection is downwardly retracted from the upper surface of the film mount.

With the above, the film or holder is no longer restricted in its movable range. Hence, a trimming operation becomes possible.

That is, the switchover of the positioning means between the position-fixing state and the position-releasing state is realized only with the engagement between the operating element of the fixing cover and the projection-retracting member urged by the projection urging means.

As a result, in comparison with a conceivable construction in which an actuator such as a solenoid is provided for causing the projection and retraction of the positioning projection, the above construction is advantageous in that the trimming operation becomes possible with such simple operation and construction.

According to a still further aspect of the present invention, the fixing cover includes a pressing member which is urged downwards. When this pressing member comes into contact with the film mount to prevent the fixing cover from moving to the full closed state, the positioning means is switched over to the position-releasing state. A lock means is provided for maintaining the fixing cover at the full closed state when the cover has reached this full closed state.

With the above construction, when the fixing cover is closed, the pressing member of the fixing cover comes into contact with the film mount, whereby the fixing cover is prevented from reaching the full closed state and the cover is maintained at the intermediate position before the full closed position.

In the above condition, the positioning means is under the position-releasing state, so that a trimming operation may be effected without having to support the fixing cover.

Then, after completion of the trimming operation, the fixing cover is allowed to reach the full closed state and the cover is reliably maintained at this state by the lock means.

In this full closed state, as the pressing member presses the film or its holder, the film or holder may be effectively and reliably maintained at this state.

As a result, as the trimming operation is possible with no necessity of supporting the fixing cover and the full closed state of the cover may be reliably maintained. The apparatus with these features is more convenient for handling.

According to a still further aspect of the present invention, the fixing cover is pivotably supported by the film mount and the operating element is provided adjacent a pivot point of the fixing cover.

With this construction, when the fixing cover is closed by its pivotal operation, in the middle of its pivotal movement toward the full closed state, the operating element of the fixing cover comes into contact with the projection/retraction member so as to depress the positioning projection which has been projecting upwards from the upper surface of the film mount, so that the projection is retracted downwards away from the upper surface of the film mount.

In the above, as the operating element of the fixing cover is provided in the vicinity of the pivot point of the cover, if the depression of the positioning projection against the urging force of the projection urging means has to be effected by means of the weight of the fixing cover, it is not necessary for this fixing cover to have a significant weight for achieving the above object.

As a result, the fixing cover may be closed and opened with a light operation feel. Hence, the apparatus with this feature is still more convenient for handling.

Further and other objects, features and effects of the invention will become more apparent from the following more detailed description of the embodiments of the invention with reference to the accompanying drawings.

DETAILED DESCRIPTION OF THE PREFERRED EMBODIMENTS

Preferred embodiments of a photographic printer having a film charging apparatus of the invention will be elaborated with reference to the accompanying drawings.

Figure 1:
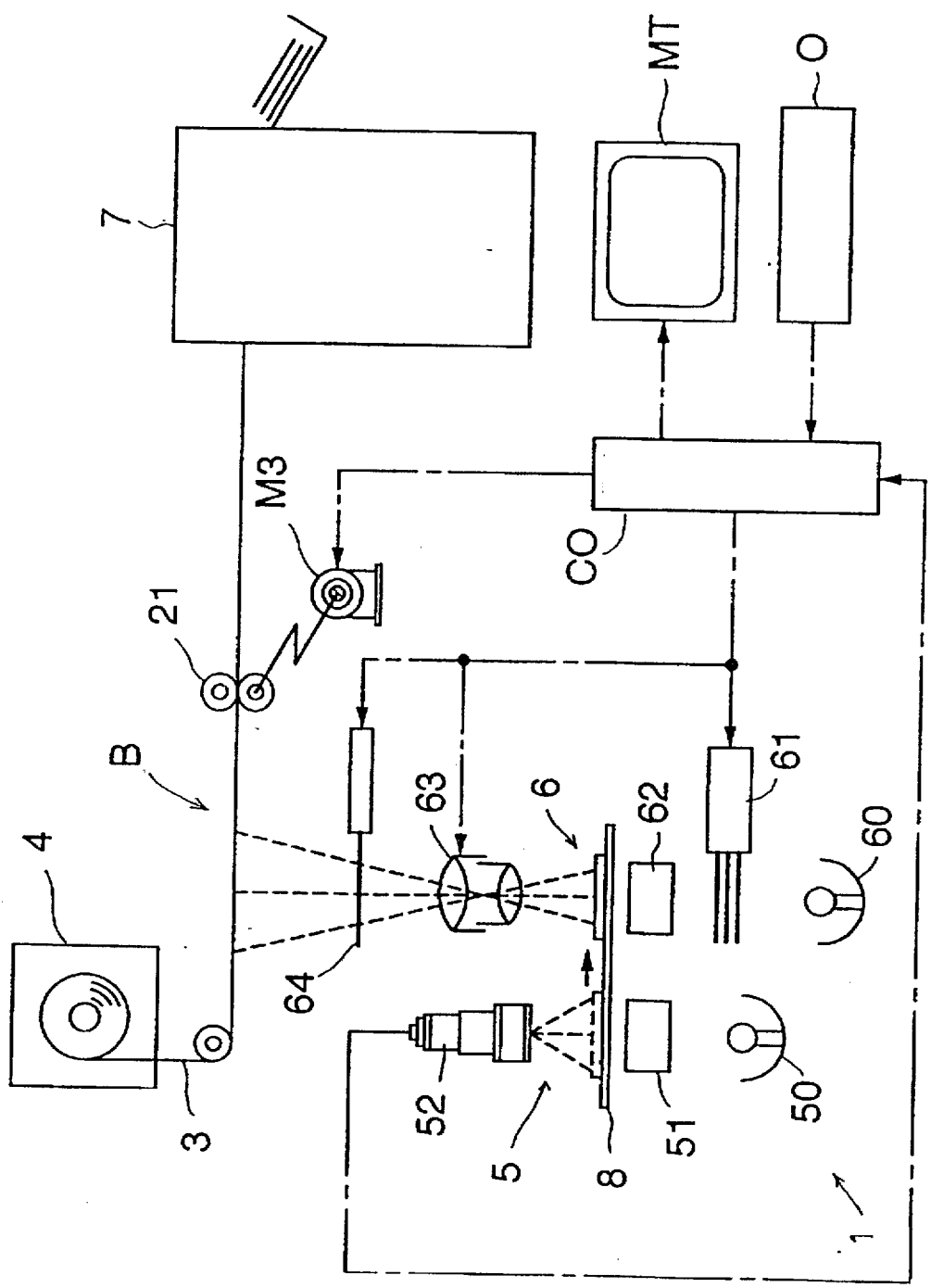
FIG. 1 is a schematic construction view showing one preferred embodiment of a photographic printer implementing the present invention.

As shown in FIG. 1, a photographic printer 1 includes an image information reading unit 5 for reading image information of a film 2 such as a negative, a projection exposure unit 6 for effecting a projection exposure of the image of the film 2 on printer paper 3, a developing unit 7 for developing the exposed print paper 3, and a controller CO for controlling the overall operations of this photographic printer 1.

Image density information is obtained based on the image information of the film 2 read at the image information reading unit 5. Then, based on this density information, the controller CO determines exposure conditions to be used at the projection exposure unit 6.

At the projection exposure unit 6, under the determined exposure conditions, a projection exposure operation of the image of the film 2 is effected on to the print paper 3 withdrawn from a paper magazine 4 in which the print paper 3 has been stored in a rolled state. The exposed print paper 3 is developed at the developing unit 7 and this developed paper is cut into a paper piece containing one frame amount of image information and discharged in this form from the printer.

Next, the respective components will be described in details.

The image information reading unit 5 includes a reading light source 50 for irradiating the film 2, a reading mirror tunnel 51 for rendering uniform the light from the light source 50 by eliminating spatial brightness irregularity of the light, and an image sensor unit 52 incorporating a CCD image sensor and a zooming lens and operable to read the image information of the film 2 with separating the transmission light through the film into the three primary color components. And, these units and component are arranged along a common optical axis.

The projection exposure unit 6 includes a light modulating filter 61 for adjusting the color balance of the light to be irradiated on the film 2, an exposure mirror tunnel 62 for uniformly mixing the color components of the light past the light modulating filter 61, a printing zooming lens 63 for imaging the image information of the film 2 on the print paper 3, and a shutter 64, with these mentioned components being arranged along a common optical axis.

Across the setting position of the film 2 at the image information reading unit 5 and the setting position of the film at the projection exposure unit 6, there is provided a film conveyer unit 8 for conveying the film 2 between the image information reading unit 5 and the projection exposure unit 6.

Figure 2:
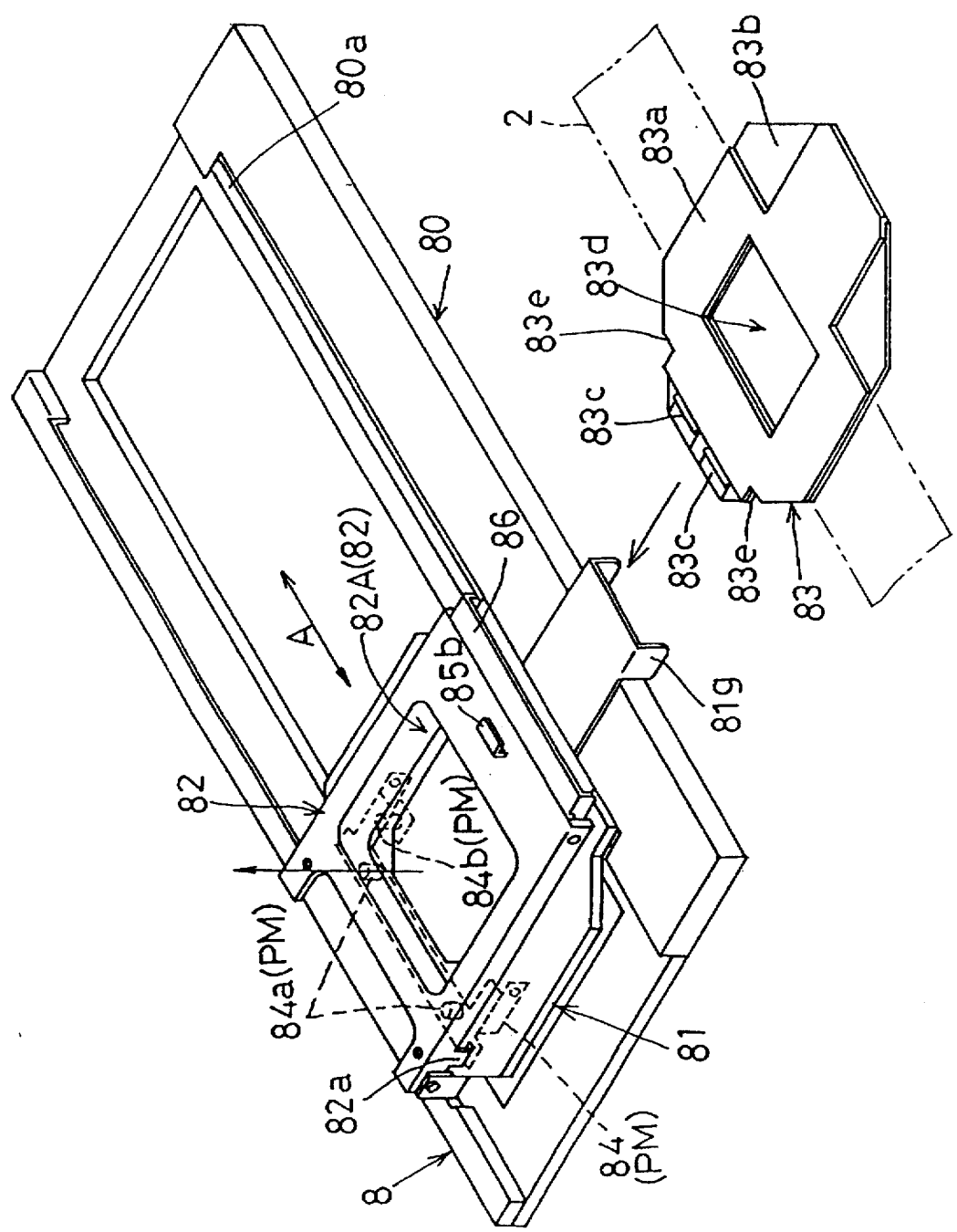
FIG. 2 is a perspective view showing principal portions of the embodiment of the invention.

As shown in FIG. 2, the film conveyer unit 8 includes a rectangular mount 80, a mask base slidable in the direction of arrow A along a guide rail 80a provided on the mount 80, a film-carrier fixing cover 82 having one side thereof pivotably supported to the mask base 81, and a film carrier detachably attached between the mask base 81 and the film carrier fixing cover 82 and functioning as a film holder for binding and holding the film 2.

The film carrier 83 includes an upper plate 83a pivotably attached to a lower plate 83b via a hinge 83c. The upper plate 83a and the lower plate 83b respectively define, at the center thereof, an opening 83d for allowing passage therethrough of light respectively from the reading light source 50 and the exposure light source 60. The film 2 is fixedly bound between the upper plate 83a and the lower plate 83b.

Figure 3:
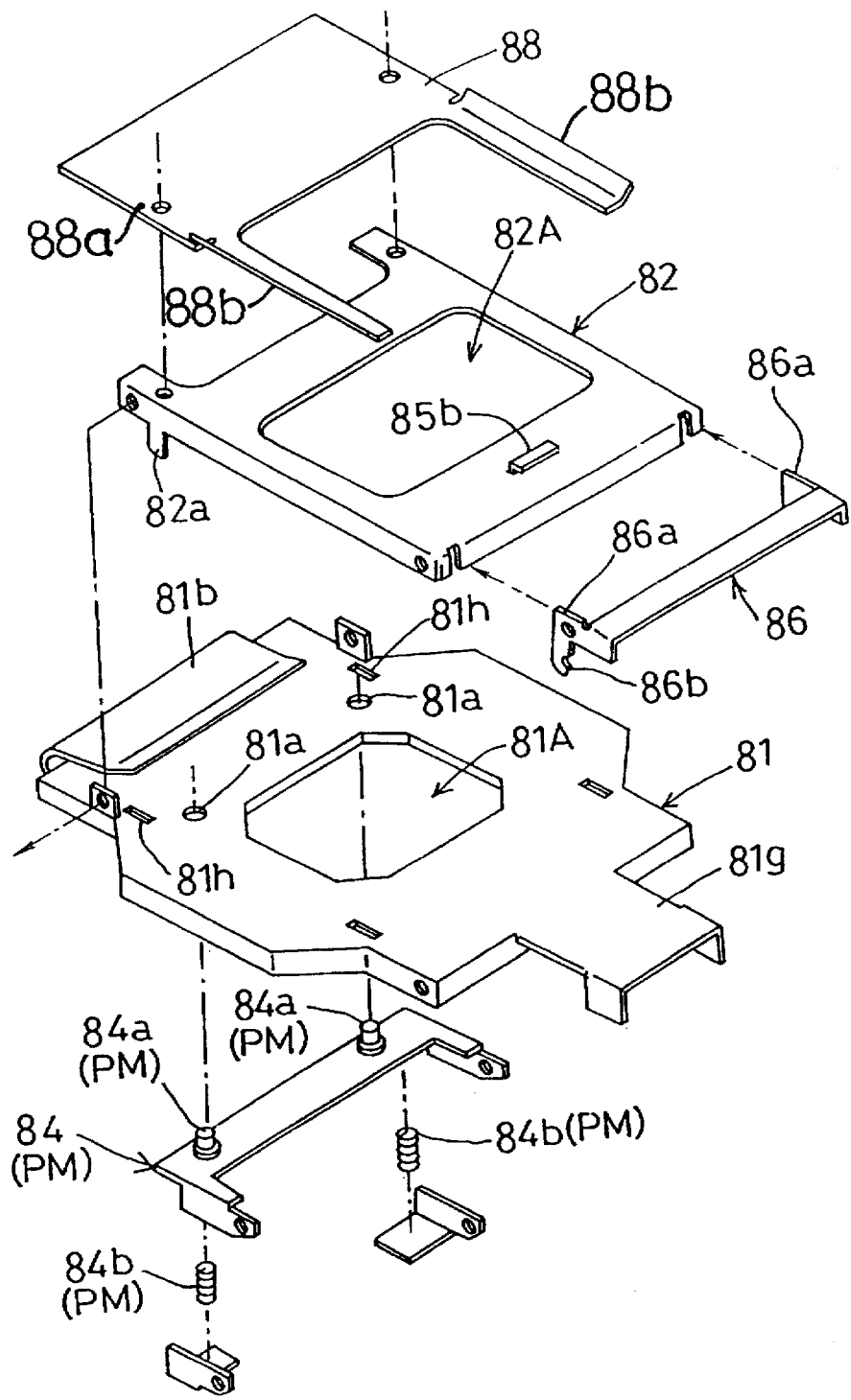
FIG. 3 is an exploded perspective view showing principal portions of the embodiment of the invention.

As shown in FIG. 3, the mask base 81 defines, at the center thereof, an opening 81A for allowing passage therethrough of the light respectively from the reading light source 50 and the exposure light source 60. This opening 81A is formed sufficiently larger than the opening 83d of the film carrier 83. When the mask base 81 functions as a film mount to support the film carrier 83 from the under, the opening 83d of the film carrier 83 is located, in plan view, within the opening 81A of the mask base 81.

Figure 4A:
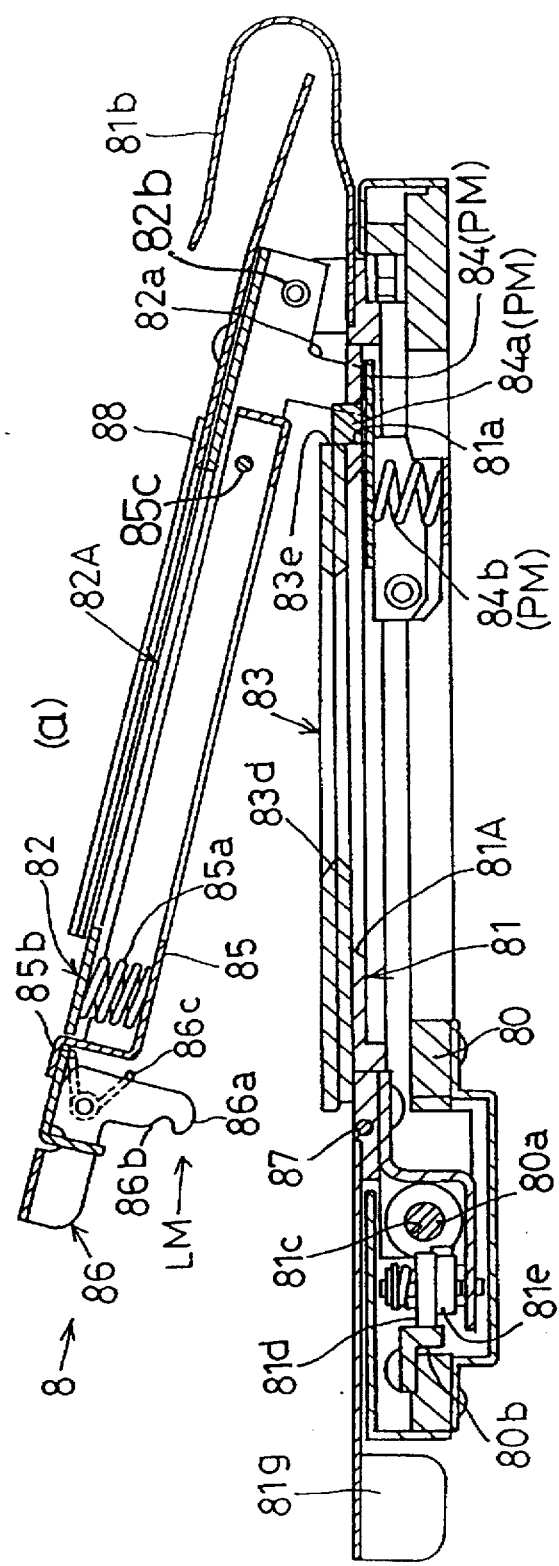
FIG. 4a is a side section view showing the film carrier fixing cover in the open position.
Figure 4B:
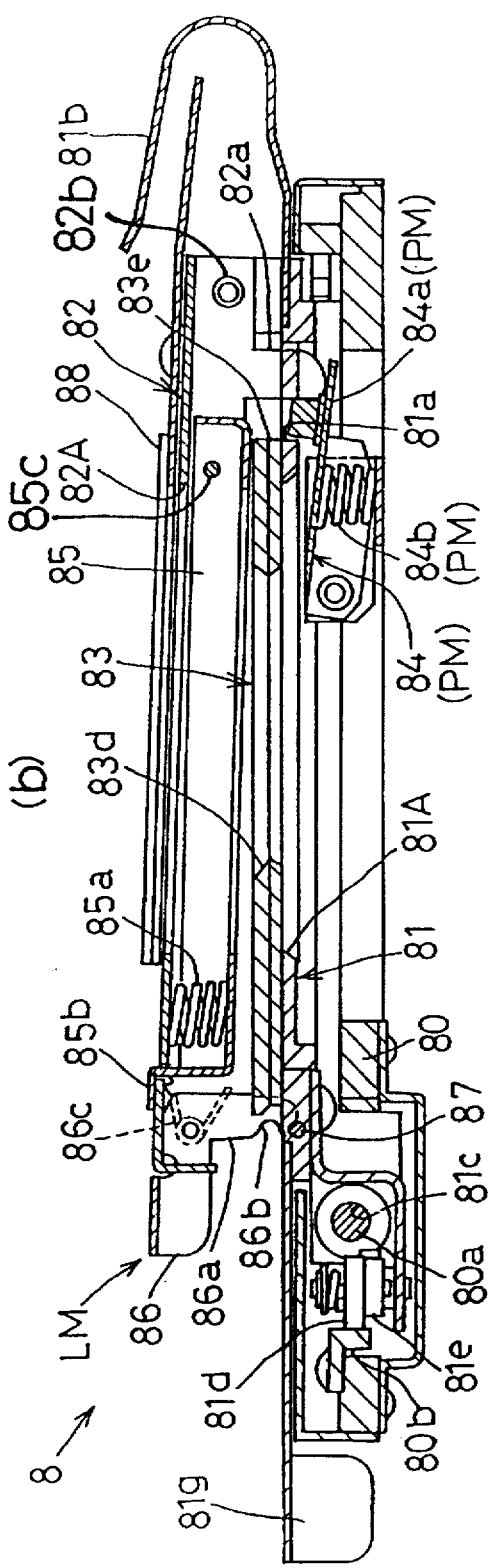
FIG. 4b is a side section view showing the film carrier fixing cover in an intermediate position.
Figure 5:
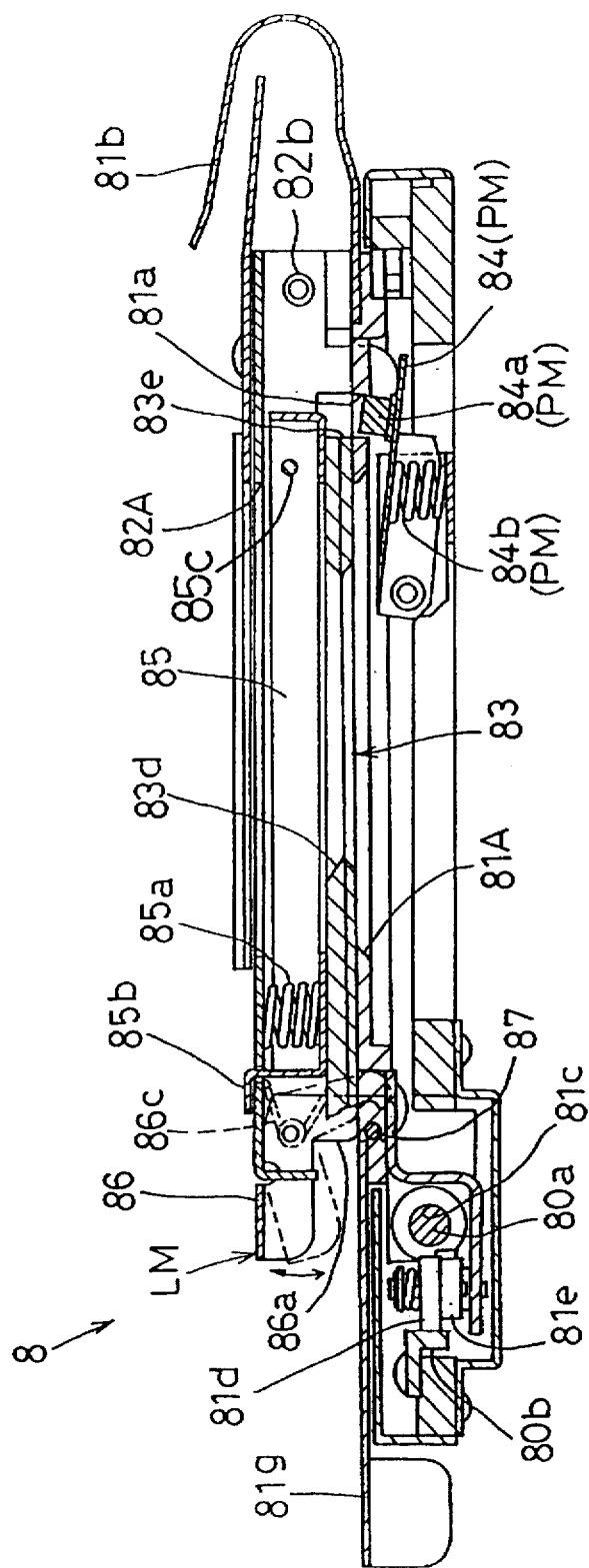
FIG. 5 is a further side section view showing one film carrier fixing cover in the closed and locked position.

As shown in FIGS. 3 through 5, the mask base 81, pivotably carries a projection/retraction operating member 84 having cylindrical positioning guides 84a operatively connected thereto and this mask base 81 is urged upwards by means of springs 84b.

Under the urging forces of the springs 84b, the positioning guides 84a project respectively through openings 81a defined in the mask base 81 to project upwards from an upper surface of the mask base 81. Accordingly, the springs 84b act as projection urging means for urging the projection/retraction operating member 84 and the positioning guides 84a to their projecting sides.

In association with a pivotal movement of the projection retraction operating member 84, the positioning guides 84a, as a positioning projection, are projectable and retractable relative to the upper surface of the mask base 81 as a film mount. When the positioning guides 84a project upwards from the upper surface of the mask base 81, the guides 84a come into contact with respective positioning portions 83e of the film carrier 83 thereby to restrict a movable range of the film carrier 83. This is a position-fixing state of the guides or the positioning projection.

Figure 6:
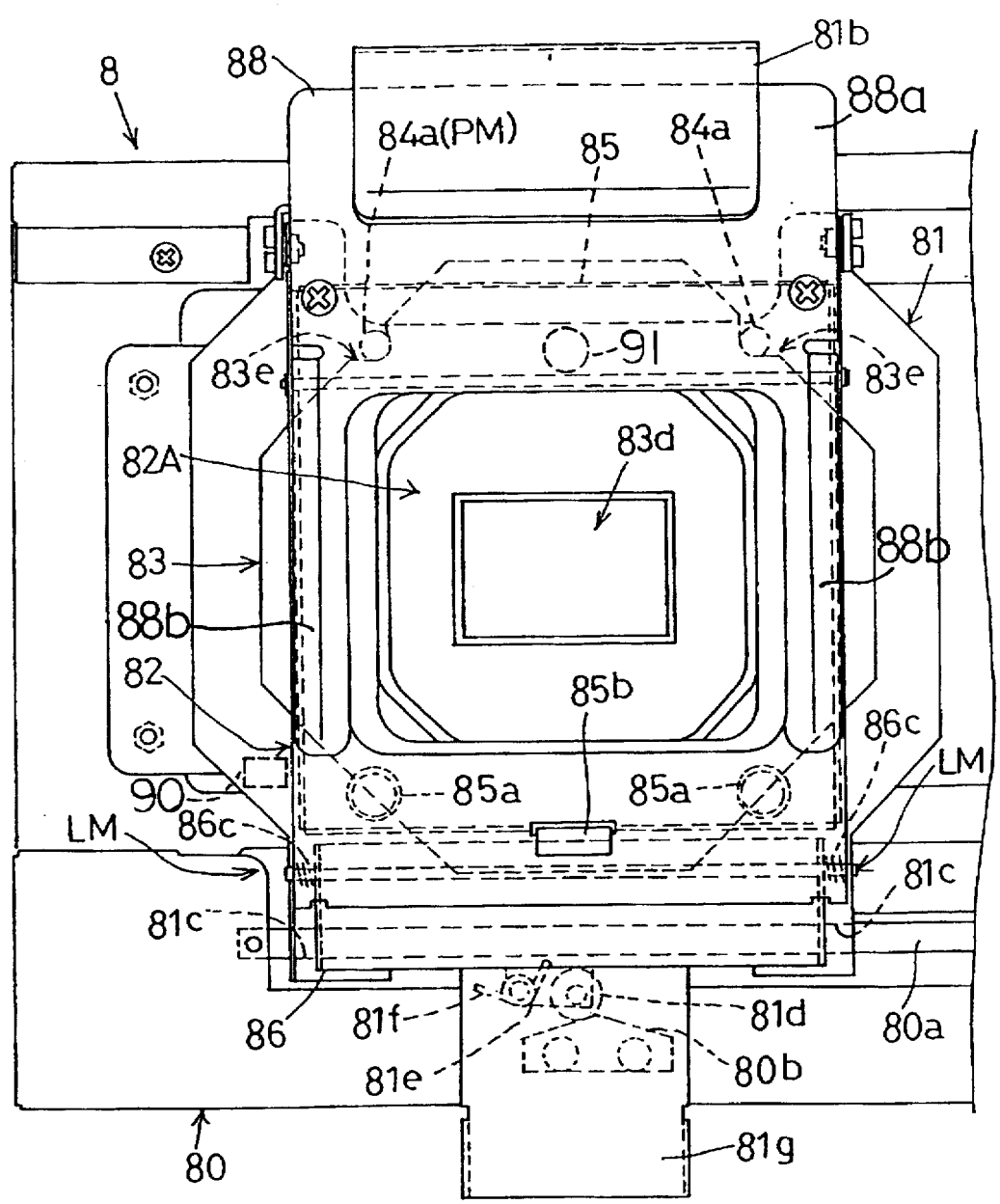
FIG. 6 is a plan view showing principal portions of the embodiment of the invention.

As shown in FIG. 6, the mask base 81 defines, at two positions adjacent opposed ends in a lower face thereof, guide holes 81c for inserting the guide rail 80a; and a pivot plate 81e rotatably mounting an anti-reverse roller 81d is pivotably supported in a plan view to a position substantially at the center between the two guide holes 81c. The pivot plate 81e is urged clockwise in FIG. 6 by means of a torsion coil spring 81f.

When the mask base 81 is moved along the guide rail 80a to either end of the mount 80, the mask base 81 is located within the image information reading unit 5 or the projection exposure unit 6. Then, as shown in FIG. 6, as the anti-reverse roller 81d is supported against an inclined face provided at an end of a stopper 80b of the mount 80 and the torsion coil spring 81f provides the urging force, movement of the mask base 81 is prevented.

Incidentally, while FIG. 6 illustrates the case where the mask base is set at the image information reading unit 5, the mask base is set at the projection exposure unit 6 by the same construction as the one illustrated in FIG. 6.

As shown in FIG. 3, the film-carrier fixing cover 82 defines, at the center thereof, an opening 82A for allowing passage therethrough of the light respectively from the reading light source 50 and the exposure light source 60. This opening 82A is formed sufficiently larger than the opening 83d of the film carrier 83.

To the lower face of the film-carrier fixing cover 82, there is attached a film-carrier pressing plate 85 as a pressing member for pressing the film carrier 83, with the pressing plate 85 being vertically pivotable about a pivot point 85c.

The film-carrier pressing plate 85 is urged downwards by means of springs 85a and a free end of the film-carrier pressing plate 85 extends upwards and then is bent to form a stopper element 85b projecting toward the upper surface of the film-carrier fixing cover 82, thereby to restrict a downward movement of the film-carrier pressing plate 85. When the film-carrier fixing cover 82 is fully closed relative to the master base 81, under the urging forces of the springs 85a, the film-carrier fixing cover 82 presses and fixes, from the under, the film carrier 83 supported on the mask base 81. Accordingly, this cover functions as a fixing cover.

Adjacent the free end of the film-carrier fixing cover 82, there is provided a major portion of lock means LM for maintaining the film-carrier fixing cover 82 at its full closed state.

The lock means LM includes a lock release member 86 which is vertically pivotable, stopper elements 86b projecting downwards from opposed ends of the lock release member 86 and having respective stopper recesses 86b, and torsion coil springs 86c mounted on a pivot shaft of the lock release member 86 for urging this lock release member 86 clockwise in FIGS. 4 and 5.

In operation, the engaging recesses 86b of the lock means LM comes into engagement with pins 87 of the mask base 87 and this engaged condition is maintained by the urging forces of the torsion coil springs 86c, whereby the film-carrier fixing cover is maintained at its full closed state. In this full closed state, the film carrier 83 is pressed and fixed by the urging forces of the springs 85a of the film-carrier pressing plate 85.

Further, for opening the film-carrier fixing cover 82, as indicated by two alternate short and long dashed line in FIG. 5, the lock release member 86 is pivoted downwards by a manual operation to release the locked engagement between the engaging recesses 86b and the pins 87.

Above the upper face of the film-carrier fixing cover 82, as shown in the plan view of FIG. 6, there is provided an elastic film presser 88 having a 'U'-shaped configuration in the plan view. This film presser 88 includes a rectangular base portion 88a and a pair of elastic pressing portions 88b extending from opposed side ends of the base portion 88a. In operation, this film presser 88 functions to bind the leading end of the film 2 extending beyond the side end of the film carrier 83 in FIG. 6 with the upper surface of the film-carrier fixing cover 82, so as to prevent the film 2 from interfering with the other components of the apparatus.

Incidentally, when the film carrier 83 is rotated by 90 degrees from its posture shown in FIG. 2, i.e. when the carrier 83 is set to the mask base 81 with reversing the orientation of the vertical and lateral sides of the film 2, the portion of the film 2 extending beyond the film carrier 83 is guided by a guide member 81b having a U-shaped cross section and disposed in the vicinity of the portion of the mask base 81 at which the film-carrier fixing cover 82 is pivoted, so that the film portion is raised toward the upper surface of the film-carrier fixing cover 82 so as not to interfere with the other components.

The film-carrier fixing cover 82 includes position-releasing operating elements 82a formed slightly on the free-end sides of the cover relative to the pivot axis 82b of this cover 82 and projecting downwards from the opposed ends of the fixing cover 82. Then, in association with a closing operation of the film-carrier fixing cover 82, the operating elements 82a move past openings 81h defined in the mask base 81 to eventually come into contact with the projection/retraction operating members 84, so that the weight of the film-carrier fixing cover 82 is allowed to press down the positioning guides 84a together with the projection/retraction operating members 84 against the urging forces of the springs 84b. Again, as shown in FIG. 4, these operating elements 82a are disposed in the vicinity of the pivot axis 82b.

When the upper ends of the positioning guides 84a are retracted downwards from the upper surface of the mask base 81, the film carrier 83 is released from its restriction of the movable range and becomes freely movable, so that the position-fixing state is switched over to the position-releasing state.

When the film carrier fixing cover 82 is closed by a manual operation to a degree sufficient to cause the film carrier pressing plate 85 to come into contact with the film carrier 83, the springs 85a exert urging forces to prevent the film carrier fixing cover 82 from reaching its full closed state and to maintain this posture. As shown in FIG. 4(a), under this condition, the film carrier fixing cover 82 has already been switched over to the position-releasing state.

Accordingly, the projection/retraction operating member 84, the positioning guides 84a and the springs 84b together function as positioning means PM which is set at the position-fixing state when the film-carrier fixing cover 82 is under a predetermined opened condition, i.e. when the position-release operating elements 82a of the film-carrier fixing cover 82 are located away from the projection/retraction operating member 84 and which is switched over to the position-releasing state in the middle of a movement of the film-carrier fixing cover 82 to its full closed state with a closing operation of this fixing cover 82.

Next, the functions of the photographic printer having the above-described construction will be briefly described.

First, the film-carrier fixing cover 82 is opened while the mask base 81 is located at the terminal end of the mount 80 on the side of the image information reading unit 5. Then, the film carrier 83 charged with a film 2 to be printed is set on the upper surface of the mask base 81.

As shown in FIG. 4(a), when the film-carrier fixing cover 82 is opened, the positioning guides 84a project from the upper surface of the mask base 81, so that the positioning operation of the film carrier 83 is effected by placing the carrier into abutment against the positioning guides 84a.

After the positioning operation of the film carrier 83, the film-carrier fixing cover 82 is closed to place this cover 82 over the film carrier 83, as illustrated in FIG. 4(b).

When the film-carrier fixing cover 82 is placed over the film carrier 83, the Cover 82 has not yet reached its full closed condition due to the function of the springs 85a which urge the film-carrier pressing plate 85 downwards. In other words, under this condition, only the weight of the film-carrier fixing cover 82 is applied to the film carrier 83. Further, under this condition, the positioning guides 84a have already retracted downwards away from the upper surface of the mask base 81.

Therefore, the film carrier 83 remains freely movable on the mask base 81 without any restriction by the positioning guides 84a. Thus, for effecting a trimming operation, a position adjustment operation of the film carrier 83 is possible by gripping an end of this film carrier 83.

As the mask base 81 is now located at the image information reading unit 5, an image of the film 2 charged in the film carrier 83 is read by the image sensor unit 52. Then, in case the film 2 comprises a negative film, the read image information is first subjected to a negative-positive conversion operation by the controller CO and then displayed on a monitor MT. On the other hand, if the film 2 comprises a positive film, the read image information is directly displayed on the monitor MT.

While observing the display on monitor MT, an operator effects a position adjustment operation of the film carrier 83 while varying a zoom ratio of the image sensor unit 52 if necessary. After completion of this position adjustment, the film-carrier fixing cover 82 is forcibly pressed down against the urging forces of the springs 85a of the film-carrier pressing plate 85 and this full closed state of the cover 82 is maintained by the lock means LM.

On the other hand, when no trimming operation is effected, from the above-described condition in which the film-carrier fixing cover 82 is loosely placed over the film carrier 83 (FIG. 4b), the cover 82 is brought directly into its full closed state to be locked at this state (FIG. 5).

When the positioning operation and the image reading operation are completed at the image information reading unit 5, the controller CO determines exposure conditions to be used at the projection exposure unit 6, based on density information of the read image.

On the other hand, the operator will grip a handle 81g attached to the mask base 81 to move this mask base 81 to the projection exposure unit 6, where the image of the film 2 is printed on the print paper 3 under the exposure conditions determined by the controller CO. As the positioning operation of the film 2 has already been completed at the image information reading unit 5, no positioning operation of the film 2 is needed at this projection exposure unit 6, so that the printing operation may be effected immediately without any film positioning operation.

[Other Embodiments]

Next, some other embodiments of the invention will be specifically described.

(1) In the foregoing embodiment, the film 2 is supported on the mask base 81 with the film 2 being bound within the film carrier 83 as the film holder. Instead, the film 2 may be supported directly on the mask base 81.

(2) In the foregoing embodiment, the switchover operation from the position-fixing state to the position-releasing state is effected as the position-release operating elements 82a of the film-carrier fixing cover 82 depress the projection/retraction operating member 84 of the mask base 81. A further construction is conceivable. In this, when the film-carrier fixing cover 82 is closed, the arrival of the fixing cover 82 at the intermediate state is detected by a proximity sensor. With this detection, the positioning guides 84a are retracted by means of an actuator such as a solenoid, a motor or the like. The above sensor can be an optical sensor, a magnetic sensor and so on. A sensor 90 and an actuator 91 can be located as shown in phantom in FIG. 6.

(3) In the foregoing embodiment, the film-carrier fixing cover 82 is adapted to be pivoted relative to the mask base 81. Instead, this cover 82 may be vertically slidable.

(4) In the foregoing embodiment, the mask base 81 is movable between the image information reading unit 5 and the projection exposure unit 6. Instead, the mask base 81 may be fixedly disposed at the projection exposure unit 6, so that the positioning operation of the film carrier 83 is effected at the projection exposure unit 6.

In this case, if the image information of the film 2 is necessary, the image sensor unit 52 may be rendered projectable and retractable into and away from the printing optical path of the projection exposure unit 6, or a portion of the light traveling along the printing optical path may be guided to the image sensor unit 52.

(5) In the foregoing embodiment, the positioning guide 84a is formed cylindrical. Instead, a variety of other shapes are possible such as a plate-like shape. Further, a variety of modifications are possible also in the disposing position of this positioning guide 84a. For instance, the guide 84a may be disposed so as to cover the periphery of the film carrier 83.

Furthermore, although the projection/retraction operating member 84 is rendered pivotable in the foregoing embodiment, this member 84 may be rendered vertically slidable instead.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A film charging apparatus for a photographic printer, which comprises:

a film mount for supporting a film or a holder of the film from below;

a fixing cover manually openable and closable relative to the film mount and operable, in a full-closed state thereof, to fix the film or the holder supported on the film mount by pressing the film or holder from above;

positioning means switchable between a position-fixing state for fixedly positioning the film relative to the mount and a position-releasing state for releasing the film relative to the mount;

wherein the positioning means is set at the position-fixing state when the fixing cover is under a predetermined opened condition; and the positioning means is switched over to the position-releasing state when the fixing cover has reached an intermediate state before a full closed state in the course of movement thereof to the full closed state.

2. A film charging apparatus for a photographic printer, as defined in claim 1, wherein said positioning means includes a positioning projection which is projectable to a projecting state relative to an upper surface of the film mount, a projection/retraction operating member operably connected with the positioning projection, and a projection urging means for urging the projection and the projection/retraction operating member to said projecting state.

3. A film charging apparatus for a photographic printer, as defined in claim 2, wherein said positioning means is switched over to the position-releasing state when an operating element provided to the fixing cover comes into contact with the projection-retracting operating member so as to depress the positioning projection.

4. A film charging apparatus for a photographic printer, as defined in claim 2, wherein said fixing cover is pivotably supported by the film mount and said operating member is provided adjacent a pivot point of the fixing cover.

5. A film charging apparatus for a photographic printer, as defined in claim 1, wherein;

said fixing cover includes a pressing member which is urged downwards;

when said pressing member comes into contact with the film mount to prevent the film mount from moving to the full closed state, said positioning means is switched over to the position-releasing state; and a lock means is provided for maintaining the fixing cover at the full closed state when the cover has reached this full closed state.

6. A film charging apparatus for a photographic printer, as defined in claim 5, wherein said pressing member is vertically pivotably supported to a lower face of said fixing cover.

7. A film charging apparatus for a photographic printer, as defined in claim 5, wherein said pressing member includes, at a free end thereof, a stopper element which projects toward the upper surface of the fixing cover so as to restrict a downward movement of the pressing member.

8. A film charging apparatus for a photographic printer, as defined in claim 4, wherein, in association with a closing operation of the fixing cover, said operating element comes into contact with said projection/retraction member so as to allow the weight of the fixing cover to depress the positioning projection against the urging force of the projection urging means.

9. A film charging apparatus for a photographic printer, as defined in claim 1, which further comprises:

a sensor for sensing arrival of said fixing cover at said intermediate state realized before the full closed state.

10. A film charging apparatus for a photographic printer, as defined in claim 9, which further comprises:

an actuator for causing said positioning projection to retract with the detection by said sensor.

* * * * *